(12) United States Patent
Okumura et al.

(10) Patent No.: US 9,744,702 B2
(45) Date of Patent: Aug. 29, 2017

(54) COMPLEX AND METHOD FOR MANUFACTURING COMPLEX

(71) Applicant: Mitsui Chemicals, Inc., Minato-ku, Tokyo (JP)

(72) Inventors: Hiroshi Okumura, Ichihara (JP); Kiminori Uchida, Ichihara (JP); Kazuki Kimura, Ichihara (JP); Goro Inoue, Sodegaura (JP); Takeharu Isaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 70 days.

(21) Appl. No.: 14/400,922

(22) PCT Filed: Mar. 15, 2013

(86) PCT No.: PCT/JP2013/001792
§ 371 (c)(1),
(2) Date: Nov. 13, 2014

(87) PCT Pub. No.: WO2013/175693
PCT Pub. Date: Nov. 28, 2013

(65) Prior Publication Data
US 2015/0165661 A1   Jun. 18, 2015

(30) Foreign Application Priority Data

May 21, 2012   (JP) ................. 2012-116067

(51) Int. Cl.
*B32B 27/32* (2006.01)
*B32B 15/20* (2006.01)
(Continued)

(52) U.S. Cl.
CPC .. *B29C 45/14311* (2013.01); *B29C 45/14778* (2013.01); *B32B 3/266* (2013.01);
(Continued)

(58) Field of Classification Search
CPC ......... B29C 45/14311; B29C 45/14778; B32B 15/085; B32B 15/18; B32B 15/20;
(Continued)

(56) References Cited

U.S. PATENT DOCUMENTS 4,024,008 A    5/1977  Gregornik et al.
4,232,086 A *  11/1980  Mori .................. B32B 15/08
                                                  156/330
(Continued)

FOREIGN PATENT DOCUMENTS

EP    1 690 664 A1    8/2006
JP    53-036558 A     4/1978
(Continued)

OTHER PUBLICATIONS

K. Shelesh-Nezhad "Shrinkage Behavior and Mechanical Performances of Injection Molded Polypropylene/Talc Composites" Polymer Engineering and Science; Dec. 2007; 47, 12; ProQuest SciTech Collection, p. 2124-2128.*

(Continued)

*Primary Examiner* — Aaron Austin
*Assistant Examiner* — Michael Zhang
(74) *Attorney, Agent, or Firm* — Foley & Lardner LLP (57) ABSTRACT

In a complex of the invention, a resin member made of a resin material including a polyolefin and a metal member are joined together through a primer layer. In addition, the resin member is obtained by molding the resin material by injection, a coexistence layer in which a primer resin material configuring the primer layer and the resin material coexist is formed between the primer layer and the resin member, and a thickness of the coexistence layer is in a range of more than or equal to 5 nm and less than or equal to 50 nm.

13 Claims, 3 Drawing Sheets (51) Int. Cl.
| | |
|---|---|
| *B32B 15/085* | (2006.01) |
| *B29C 45/14* | (2006.01) |
| *B32B 3/30* | (2006.01) |
| *B32B 15/18* | (2006.01) |
| *B32B 27/08* | (2006.01) |
| *B32B 27/20* | (2006.01) |
| *B32B 3/26* | (2006.01) |
| *B29K 23/00* | (2006.01) |
| *B29K 105/00* | (2006.01) |
| *B29K 705/00* | (2006.01) |

(52) U.S. Cl.
CPC ............... *B32B 3/30* (2013.01); *B32B 15/085* (2013.01); *B32B 15/18* (2013.01); *B32B 15/20* (2013.01); *B32B 27/08* (2013.01); *B32B 27/20* (2013.01); *B32B 27/32* (2013.01); *B29K 2023/06* (2013.01); *B29K 2023/08* (2013.01); *B29K 2023/12* (2013.01); *B29K 2105/0085* (2013.01); *B29K 2705/00* (2013.01); *B32B 2250/03* (2013.01); *B32B 2262/0269* (2013.01); *B32B 2262/101* (2013.01); *B32B 2262/106* (2013.01); *B32B 2264/102* (2013.01); *B32B 2264/104* (2013.01); *B32B 2307/542* (2013.01); *B32B 2509/10* (2013.01); *B32B 2605/00* (2013.01); *Y10T 428/24545* (2015.01); *Y10T 428/265* (2015.01)

(58) Field of Classification Search
CPC ......... B32B 27/08; B32B 27/20; B32B 27/32; B32B 3/266; B32B 3/30; B32B 2250/03; B32B 2262/0269; B32B 2262/101; B32B 2262/106; B32B 2264/102; B32B 2264/104; B32B 2307/542; B32B 2509/10; B32B 2605/00; B29K 2023/06; B29K 2023/08; B29K 2023/12; B29K 2105/0085; B29K 2705/00; B26K 2105/0085; Y10T 428/24545; Y10T 428/265
See application file for complete search history.

(56) References Cited

U.S. PATENT DOCUMENTS

| | | | | |
|---|---|---|---|---|
| 4,675,210 | A * | 6/1987 | Clayton | C08F 255/02 156/244.11 |
| 5,102,956 | A * | 4/1992 | Holmes-Farley | C08F 8/14 525/285 |
| 2002/0150776 | A1 | 10/2002 | Imai et al. | |
| 2007/0082547 | A1* | 4/2007 | Komoto | B29C 45/14311 439/587 |
| 2010/0189958 | A1* | 7/2010 | Naritomi | B29C 45/14311 428/141 |
| 2013/0264741 | A1* | 10/2013 | Ookura | B29C 45/14811 264/259 |

FOREIGN PATENT DOCUMENTS

| | | | |
|---|---|---|---|
| JP | 04-064415 | A | 2/1992 |
| JP | 2000-289145 | A | 10/2000 |
| JP | 2004-216425 | A | 8/2004 |
| JP | 2009-006721 | A | 1/2009 |
| JP | 2010-064496 | A | 3/2010 |
| WO | WO-03/064150 | A1 | 8/2003 |
| WO | WO-2004/055248 | A1 | 7/2004 |
| WO | WO-2008/047811 | A1 | 4/2008 |
| WO | WO-2009/078466 | A1 | 6/2009 |
| WO | WO 2012060311 | A1 * | 5/2012 ....... B29C 45/14811 |

OTHER PUBLICATIONS

Misumi, Melt Flow Rate of Plastics, Jan. 13, 2012, http://www.misumitechcentral.com/tt/en/mold/2012/01/107.html.*
Ineos, "tips for Injection molding INEOS O&P Polypropylene Resins," Mar. 2009.*
Extended European Search Report issued in European Patent Application No. 13793127.5 dated Oct. 30, 2015.
Office Action issued in Korean Patent application No. 10-2014-7031339 dated Dec. 3, 2015.
International Search Report dated Jun. 18, 2013 issued in Application No. PCT/JP2013/001792.

* cited by examiner

COMPLEX AND METHOD FOR MANUFACTURING COMPLEX

CROSS REFERENCE TO RELATED APPLICATIONS

This application is the National Phase of PCT/JP2013/001792, filed Mar. 15, 2013, which claims priority to Japanese Application No. 2012-116067, filed May 21, 2012.

TECHNICAL FIELD

The present invention relates to a complex to which a resin member including a polyolefin and a metal member are joined, and a method for manufacturing the complex.

BACKGROUND ART

A technique to join a resin member and a metal member is required in a wide range of fields such as the manufacturing of components used in, for example, an automobile, a home appliance, an industrial device, and the like.

In recent years, as the technique to join a resin member and a metal member, a method of joining a resin member and a metal member by injection molding the resin member into the metal member, that is, a so-called 'injection joining method' has been proposed.

In the injection joining method, for example, a resin member and a metal member are joined together by injecting into the metal member having fine protrusions and recesses on the surface an engineering plastic having a polar group with an affinity to the metal member. Narutomi and colleagues along with Taisei plas Co., Ltd. have been conducting active studies regarding the injection joining method, and the technique is described in patent documents (for example, Patent Documents 1 to 5 and the like).

Narutomi and colleagues disclose a technique to join by injection a polybutylene terephthalate resin (hereinafter, referred to as 'PBT') or a polyphenylene sulfide resin (hereinafter, referred to as 'PPS') to an aluminum alloy (for example, refer to Patent Document 1). In addition, a technique in which a large hole is provided in an anode oxide film of an aluminum material, and a synthetic resin body is fused into the hole, and is fixed using an anchor effect is disclosed (for example, refer to Patent Document 2).

A non-polar polyolefin having no affinity to a metal member is not easily attachable to a metal member. On the other hand, an acid-modified body of a polyolefin into which a polar group has been introduced can be attached to a metal member. However, for the attachment, it is necessary to hold the polyolefin in a melted state, and maintain the metal member and the polyolefin in contact with each other at a high pressure for a long period of time. Therefore, generally, a polyolefin and a metal member are joined together using a lamination method through melt extrusion, a pressing method, or the like.

RELATED DOCUMENT

Patent Document

[Patent Document 1] Japanese Unexamined Patent Publication No. 2004-216425
[Patent Document 2] Pamphlet of International Publication No. WO2004/055248
[Patent Document 3] Japanese Unexamined Patent Publication No. 2009-6721
[Patent Document 4] Japanese Unexamined Patent Publication No. 2010-64496 [Patent Document 5] Pamphlet of International Publication No. WO2003/064150

DISCLOSURE OF THE INVENTION

Compared with the above-described lamination method, pressing method, and the like, the injection joining method has advantages in the fast molding cycle, the high degree of freedom in shape, and the like. However, there was a tendency that the resin was abruptly cooled and was thus solidified within a short period of time, and therefore a period of time during which the resin in a melted state and the metal member were in contact with each other was short.

According to the studies by the present inventors, it was found that, even when a metal member had fine protrusions and recesses molded on the surface-treated surface, it was more difficult than expected to join a polyolefin represented by a propylene-based polymer and the metal member compared with the above-described PBT or PPS.

The invention has been made in consideration of the above-described technical background, and achieves the following object. An object of the invention is to provide a complex having excellent joining strength between a metal member represented by an aluminum alloy component or a magnesium alloy component and a resin member including a polyolefin having a light weight, high stiffness, and excellent cost performance which is represented by polypropylene.

The inventors conducted intensive studies regarding the injection joining between a resin member including a polyolefin and a metal member. As a result, the inventors found that, when a primer layer is formed on at least a part of the surface of the metal member, and a resin material including a polyolefin is molded by injection onto the surface of the primer layer under specific conditions, a complex having excellent joining strength between the resin member and the meal member is obtained, and completed the invention.

That is, according to the invention, there are provided a complex and a method for manufacturing the complex described below.

[1] A complex including a resin member made of a resin material including a polyolefin and a metal member which are joined through a primer layer,
in which the resin member is obtained by molding the resin material by injection,
a coexistence layer in which a primer resin material configuring the primer layer and the resin material coexist is formed between the primer layer and the resin member, and
a thickness of the coexistence layer is in a range of more than or equal to 5 nm and less than or equal to 50 nm.

[2] The complex according to the above-described [1], in which the resin member includes a shear orientation layer.

[3] The complex according to the above-described [1] or [2],
in which the complex includes a resin intrusion layer in which the metal member and the primer layer are present in a combined form.

[4] The complex according to the above-described [3], in which a thickness of the resin intrusion layer is in a range of more than or equal to 5 nm and less than or equal to 100 nm.

[5] The complex according to the above-described [3] or [4], in which the metal member has fine protrusions and recesses formed in at least a portion in contact with the primer layer, and the resin intrusion layer is formed by infiltration of the primer resin material into the protrusions and recesses.

[6] The complex according to any one of the above-described [1] to [5], in which the resin member is obtained by molding the resin material by injection into a mold in which the metal member has been installed under conditions satisfying the following requirements (1) to (4), (1) when a temperature of the resin material during injection molding is represented by $T_1$ [° C.], and a melting point of the polyolefin is represented by $T_2$ [° C.], the $T_1$ is in a range of $T_2+70 \leq T_1 \leq T_2+140$, (2) when a temperature of the mold during the injection molding is represented by $T_3$ [° C.], the $T_3$ is in a range of $T_2-70 \leq T_3 \leq T_2-10$, (3) a pressure dwell time during the injection molding is in a range of more than or equal to 5 seconds and less than or equal to 120 seconds, and (4) a melt flow rate, which is calculated on the basis of ASTM D1238 and is measured under a condition of a load of 2.16 kg, of the polyolefin is in a range of more than or equal to 10 g/10 minutes and less than or equal to 200 g/10 minutes.

[7] The complex according to any one of the above-described [1] to [6], in which, when the complex is fractured by displacing the metal member and the resin member respectively, a fracture is in the form of a cohesive fracture of the resin member.

[8] The complex according to any one of the above-described [1] to [7], in which the primer resin material includes an acid-modified body of the polyolefin.

[9] The complex according to the above-described [8], in which a polyolefin that is a base resin of the acid-modified body of the polyolefin and the polyolefin included in the resin member belong to the same type.

[10] The complex according to the above-described [9], in which both the polyolefin that is the base resin of the acid-modified body of the polyolefin and the polyolefin included in the resin member are propylene-based polymers.

[11] The complex according to any one of the above-described [1] to [10], in which the metal member includes at least one metal material selected from a group consisting of iron, stainless steel, aluminum, an aluminum alloy, magnesium, a magnesium alloy, copper, a copper alloy, titanium, and a titanium alloy.

[12] The complex according to the above-described [11], in which the metal member includes at least one metal material selected from a group consisting of aluminum, an aluminum alloy, magnesium, a magnesium alloy, copper, and a copper alloy.

[13] The complex according to any one of the above-described [1] to [12], in which the resin member further includes at least one filler selected from a group consisting of a glass fiber, a carbon fiber, an aramid fiber, calcium carbonate, magnesium carbonate, silica, talc, clay, and glass powder, and when a content of the polyolefin is set to be 100 parts by mass, the content of the filler is in a range of more than or equal to 1 part by mass and less than or equal to 100 parts by mass.

[14] A complex including a resin member made of a resin material including a polyolefin/a primer layer/a metal member arranged in this order, in which the resin member includes a skin layer and a shear orientation layer, the skin layer and the primer layer are disposed through a coexistence layer in which a primer resin material configuring the primer layer and the resin material coexist, and a thickness of the coexistence layer is in a range of more than or equal to 5 nm and less than or equal to 50 nm.

[15] A method for manufacturing the complex according to any one of the above-described [1] to [14], including:

a step of installing the metal member having the primer layer formed on at least a part of a surface in a mold for injection molding; and a step of molding the resin material by injection in the mold so that at least a part of the resin member comes into contact with the primer layer, in which, in the step of molding the resin material by injection in the mold, the resin material is molded by injection under conditions satisfying the following requirements (1) to (4), (1) when a temperature of the resin material during injection molding is represented by $T_1$ [° C.], and a melting point of the polyolefin is represented by $T_2$ [° C.], the $T_1$ is in a range of $T_2+70 \leq T_1 \leq T_2+140$, (2) when a temperature of the mold during the injection molding is represented by $T_3$ [° C.], the $T_3$ is in a range of $T_2-70 \leq T_3 \leq T_2-10$, (3) a pressure dwell time during the injection molding is in a range of more than or equal to 5 seconds and less than or equal to 120 seconds, and (4) a melt flow rate, which is calculated on the basis of ASTM D1238 and is measured under a condition of a load of 2.16 kg, of the polyolefin is in a range of more than or equal to 10 g/10 minutes and less than or equal to 200 g/10 minutes.

According to the invention, it is possible to provide a complex having excellent joining strength between a resin member including a polyolefin and a metal member.

BRIEF DESCRIPTION OF THE DRAWINGS

The above-described object, other objects, characteristics, and advantages will be further clarified using preferable embodiments described below and the following drawings attached to the embodiments.

DESCRIPTION OF EMBODIMENTS

Hereinafter, the embodiments of the invention will be described using the drawings. Further, in all the drawings, the same components will be given the same reference numerals, and the description thereof will not be repeated. In addition, "A to B" indicates "more than or equal to A and less than or equal to B" unless particularly otherwise described.

Figure 1:
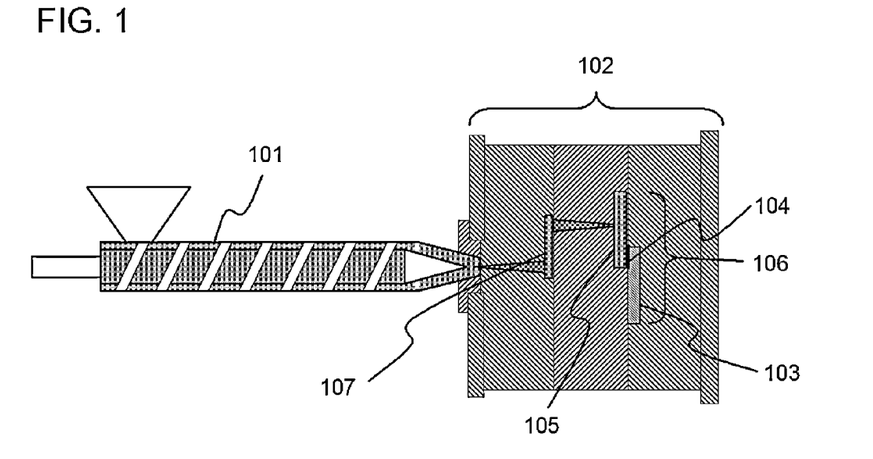
FIG. 1 is a configuration view schematically illustrating a process for manufacturing a complex of a resin member and a metal member.

FIG. 1 is a configuration view schematically illustrating a process for manufacturing a complex 106 of a resin member 105 and a metal member 103. The complex 106 according to the present embodiment includes, as a resin component, the resin member 105 made of a resin material including a polyolefin as a main component and the metal member 103 joined through a primer layer 104. The resin member 105 is obtained by molding the resin material by injection, a coexistence layer in which a primer resin material configuring the primer layer 104 and the resin material coexist is formed between the primer layer 104 and the resin member 105, and the thickness of the coexistence layer is in a range of more than or equal to 5 nm and less than or equal to 50 nm.

Hereinafter, principal elements of each of the above-described means will be described in detail.

(Metal Member)

The metal member 103 in the embodiment is not particularly limited as long as the metal member has a shape allowing the formation of a resin intrusion layer 108 with a primer resin material described below, and can be obtained using a well-known technique. Specific examples include a form as described below.

First, the metal member 103 in the embodiment preferably has fine protrusions and recesses formed on the surface of the metal member 103.

The fine protrusions and recesses are not particularly limited, but can be roughly classified into two types.

The first type of fine protrusions and recesses are protrusions and recesses obtained by immersing the metal member 103 in a corrosive aqueous solution or a corrosive suspension. When the above-described metal member 103 is observed using an electron microscope, a number of fine protrusions and recesses are formed on the surface of the metal member 103, and the number-average inner diameter of the protrusions and recesses is generally in a range of more than or equal to 10 nm and less than or equal to 80 nm.

The second type of fine protrusions and recesses are protrusions and recesses obtained using an anode oxidation method. The surface of the metal member 103 is formed mainly of a metal oxide layer, a number of fine protrusions and recesses are formed on the surface, and the number-average inner diameter of the protrusions and recesses is generally in a range of more than or equal to 10 nm and less than or equal to 80 nm.

Here, the number-average inner diameter of the protrusions and recesses refers to the average value of the inner diameters of the recessed portions of the protrusions and recesses. For example, an image of the protrusions and recesses on the surface of the metal member 103 is observed using an electron microscope, and the inner diameters of all the recessed portions observed in a 200 nm×200 nm or 300 nm×300 nm square are measured. For a non-circular recessed portion, the inner diameter of a circle having the same area is assumed. All inner diameters including the assumed inner diameters are combined, and are divided by the number of the recessed portions, thereby obtaining the number-average inner diameter.

The metal member 103 preferably has a predetermined shape obtained through plastic working such as cutting and pressing and trimming work such as machining, grinding, or electro-discharge machining of a metal material. That is, the metal member is preferably worked into a shape required for insertion for injection molding using a variety of working methods.

A metal material configuring the metal member 103 that can be used in the embodiment is not particularly limited; however, when applications described below, easy procurement, prices, and the like are taken into account, preferable examples thereof include iron, stainless steel, aluminum, an aluminum alloy, magnesium, a magnesium alloy, copper, a copper alloy, titanium, and a titanium alloy.

The linear expansion rate of a polyolefin member can be adjusted using a filler such as a glass fiber, and a material can be designed in accordance with the linear expansion rate of the metal material. When the difference in the linear expansion rate is too great, there is a case in which, even in the complex 106 integrated through injection joining, the fixing force at an interface gradually weakens due to a prolonged temperature change. However, when the linear expansion coefficient of a polyolefin is taken into account, a metal material having a great linear expansion rate is preferably used. This is because, even when the linear expansion rate is adjusted to be equal to that of the metal material by adding a filler or the like to the polyolefin member, there is a possibility of the degree of freedom in adjusting properties such as the degradation of fluidity or breaking elongation becoming narrower. From the above-described viewpoint, the metal member 103 in the embodiment preferably includes at least one metal material selected from a group consisting of aluminum, aluminum alloys, magnesium, magnesium alloys, copper, and copper alloys.

Examples of the magnesium alloy configuring the metal member 103 include wrought magnesium alloys standardized by ASTM or Japanese industrial Standards (JIS), casting magnesium alloys for a die casting method or a thixo-molding method, and the like.

Examples of the aluminum alloy that can be used include wrought aluminum alloys No. 1000 to 7000 and a variety of die casting-grade aluminum alloys.

(Primer Layer)

The primer layer 104 is not particularly limited; however, generally, the primer layer is made of a primer resin material including a resin component. There is no particular limitation regarding a primer resin material, and a well-known material can be used. Specific examples thereof include well-known polyolefin-based primers, epoxy-based primers, urethane-based primers, and the like. Two or more primer resin materials can be used in a combined form, such as one formed of multiple layers.

In the embodiment, since the resin material configuring the resin member 105 includes a polyolefin as a main component, among the above-described materials, polyolefin-based primers are preferred as the primer resin material. A polyolefin-based primer preferably includes a polyolefin having a functional group (hereinafter, also referred to as a functional group-containing polyolefin), and more preferably includes an acid-modified body of a polyolefin.

Examples of the acid-modified body of a polyolefin include bodies obtained by modifying a polyolefin such as an ethylene-based polymer or a propylene-based polymer using maleic acid anhydride.

There is no particular limitation regarding the method for forming the primer layer 104, and for example, the primer layer can be formed by applying a solution or emulsion of the above-described polymer having a functional group to the metal member 103. Examples of a solvent for the polyolefin include toluene, methyl ethyl ketone (MEK), dimethylformamide (DMF), and the like. Examples of a medium for the emulsion include aliphatic hydrocarbon media, water, and the like.

There is no particular limitation regarding the introduction of the functional group into the polyolefin, and a well-known method can be used; however, when productivity or costs are considered, it is preferable to introduce the functional group into the polyolefin using a method for grafting a compound having a functional group (hereinafter, also referred to as a functional group-containing compound) onto the polyolefin.

Here, examples of the functional group include groups including a hetero atom. Specific examples thereof include an ester group, a carboxylic group, an aldehyde group, a ketone group, and the like. Among the above-described groups, the carboxylic group is preferred. The amount of the functional group-containing compound introduced into the polyolefin is preferably in a range of 0.001 mass % to 5 mass %, more preferably in a range of 0.01 mass % to 4 mass %, and still more preferably in a range of 0.1 mass % to 4 mass % with respect to 100 mass % of the functional group-containing polyolefin.

As the polyolefin that serves as a base resin, it is possible to employ a well-known polyolefin such as ethylene-based copolymers, propylene-based copolymers, butane-based polymers, 4-methyl-1-pentene-based polymers, ethylene/α-olefin copolymers, a polymer of at least one olefin selected from a group consisting of ethylene, propylene, butane, and 4-methyl-1-petene and an olefin having 2 to 20 carbon atoms.

When the easy procurement or cost of the polyolefin is taken into account, an ethylene-based polymer, a propylene-based polymer, or an ethylene/α-olefin copolymer is preferred. Meanwhile, in the embodiment, the term '-based polymer' means to include copolymers.

Specific examples of the functional group-containing polyolefin including the ethylene-based polymer as the base resin include maleic acid anhydride-graft modified ethylene-based polymers, maleic acid anhydride/ethylene copolymers, and ternary copolymers of ethylene/acrylic acid ester/maleic acid anhydride.

Specific examples of the functional group-containing polyolefin including the propylene-based polymer as the base resin include maleic acid anhydride-graft modified propylene-based polymers, maleic acid anhydride/propylene copolymers, and ternary copolymers of propylene/acrylic acid ester/maleic acid anhydride.

The functional group-containing polyolefin in the embodiment can be obtained by, for example, reacting the polyolefin and the functional group-containing compound at a specific ratio. Hereinafter, a case in which an ethylene/α-olefin copolymer is used as the polyolefin will be described.

The ethylene/α-olefin copolymer is a copolymer of ethylene and an olefin, for example, an α-olefin having 3 to 20 carbon atoms such as propylene, 1-butene, 1-hexene, 4-methyl-1-pentene, 1-octene, or 1-decene. Specific examples of the ethylene/α-olefin copolymer before being modified in the embodiment include ethylene/propylene copolymers, ethylene/1-butene copolymers, ethylene/1-hexene copolymers, ethylene/1-octene copolymers, ethylene/4-methyl-1-petene copolymers, and the like. Among the above-described ethylene/α-olefin copolymers, ethylene/propylene copolymers, ethylene/1-butene copolymers, ethylene/1-hexene copolymers, and ethylene/1-octene copolymers are preferred.

In the ethylene/α-olefin copolymer in the embodiment, the content ratio of a structural unit derived from the ethylene is preferably in a range of 70 mol % to 99.5 mol %, and more preferably in a range of 80 mol % to 99 mol %. In addition, the content ratio of a structural unit derived from the α-olefin is preferably in a range of 0.5 mol % to 30 mol %, and more preferably in a range of 1 mol % to 20 mol %.

In the ethylene/α-olefin copolymer in the embodiment, the melt flow rate (MFR), which is calculated on the basis of ASTM D1238 and is measured under conditions of a temperature of 190° C. and a load of 2.16 kg, is preferably in a range of 0.01 g/10 minutes to 20 g/10 minutes, and more preferably in a range of 0.05 g/10 minutes to 20 g/10 minutes.

The ethylene/α-olefin copolymer in the embodiment is not particularly limited, and can be obtained by a well-known method using a transition metal catalyst such as a titanium (Ti)-based catalyst, a vanadium (V)-based catalyst, a chromium (Cr)-based catalyst, or a zirconium (Zr)-based catalyst. For example, the ethylene/α-olefin copolymer can be manufactured by, for example, copolymerizing ethylene and one or more α-olefins having 3 to 20 carbon atoms in the presence of a Ziegler-based catalyst or metallocene-based catalyst made up of a V compound and an organic aluminum compound. Particularly, a method for manufacturing the ethylene/α-olefin copolymer using the metallocene-based catalyst is preferred.

To obtain the functional group-containing ethylene/α-olefin copolymer in the embodiment using the above-described polymer, for example, the functional group-containing ethylene/α-olefin copolymer is obtained by graft-modifying the ethylene/α-olefin copolymer using a functional group-containing compound corresponding to the functional group structural unit.

Examples of the functional group-containing compound include unsaturated carboxylic acid or derivatives thereof, and specific examples thereof include unsaturated carboxylic acids such as acrylic acid, methacrylic acid, α-ethyl acrylate, maleic acid, fumaric acid, itaconic acid, citraconic acid, tetrahydrophthalic acid, methyltetrahydrophthalic acid, and endo-cis-bicyclo[2,2,1]hepto-5-en-2,3-dicarboxylic acid (NADIC ACID (registered trademark)), acid halides thereof, derivatives of amides, derivatives of imides, acid anhydride, and ester, and the like. Among the above-described functional group-containing compounds, unsaturated dicarboxylic acid or acid anhydrides thereof are preferred, and specifically, maleic acid, endocis-bicyclo[2.2.1]hept-2,3-dicarboxylic acid (NADIC ACID; registered trademark), and acid anhydrides thereof are preferred. Particularly, maleic acid anhydride is preferred.

The graft-modification of the ethylene/α-olefin copolymer can be carried out using a well-known method. For example, the graft-modification of the ethylene/α-olefin copolymer can be obtained by dissolving the ethylene/α-olefin copolymer in an organic solvent, next, adding an unsaturated carboxylic acid, a derivative thereof, a radical initiator, and the like to the obtained solution, and causing a reaction at a temperature ordinarily in a range of 60° C. to 350° C., and preferably in a range of 80° C. to 190° C. for 0.5 hours to 15 hours, and preferably for 1 hour to 10 hours.

The organic solvent is not particularly limited as long as the organic solvent is capable of dissolving the ethylene/α-olefin copolymer, and examples thereof include aromatic carbon hydrogen-based solvents such as benzene, toluene, and xylene; aliphatic hydrocarbon-based solvents such as pentane, hexane, and heptane; and the like.

Another graft modification method is a method in which an extruder or the like is used, preferably, a solvent is not jointly used, and the ethylene/α-olefin copolymer and an unsaturated carboxylic acid or a derivative thereof are reacted. Regarding the reaction conditions in this case, the reaction temperature is generally equal to or higher than the melting point of the ethylene/α-olefin copolymer, and specifically in a range of 100° C. to 350° C., and the reaction time is generally in a range of 0.5 minutes to 10 minutes.

To efficiently carry out the graft copolymerization of the functional group-containing compound such as the unsaturated carboxylic acid, it is preferable to carry out a reaction in the presence of the radical initiator. Examples of the radical initiator include organic peroxides or organic peresters such as benzoyl peroxide, dichlorobenzoyl peroxide, dicumyl peroxide, di-t-butyl peroxide, 2,5-dimethyl-2,5-di(peroxide benzoate)hexyne-3,1,4-bis(t-butyl peroxyisopropyl)benzene, lauroyl peroxide, t-butyl peracetate, 2,5-dimethyl-2,5-di(t-butyl peroxy)hexyne-3,2,5-dimethyl-2,5-di(t-butylperoxy)hexane, t-butyl perbenzoate, t-butyl perphenyl acetate, t-butyl perisobutylate, t-butyl per-sec-octate, t-butyl perpivalate, cumyl perpivalate, and t-butyl perdiethyl acetate; azo compounds such as azobisisobutyronitrile and dimethyl azoisobutyrate; and the like. Among the above-described radical initiators, dialkyl peroxides such as dicumyl peroxide, di-t-butyl peroxide, 2,5-dimethyl-2,5-di(t-butyl peroxy)hexyne-3,2,5-dimethyl-2,5-di(t-butylperoxy)hexane, and 1,4-bis(t-butylperoxyisopropyl)benzene are preferred. The radical initiator is used in a proportion generally in a range of 0.001 parts by mass to 1 part by mass in 100 parts by mass of the ethylene/α-olefin copolymer before being modified.

The density of the ethylene/α-olefin copolymer in the embodiment is preferably in a range of 0.80 g/cm$^3$ to 0.95 g/cm$^3$, and more preferably in a range of 0.85 g/cm$^3$ to 0.90 g/cm$^3$.

The amount of the functional group-containing compound introduced into the functional group-containing ethylene/α-olefin copolymer is generally in a range of 0.1 mass % to 1.8 mass %, and more preferably in a range of 0.2 mass % to 1.5 mass % with respect to 100 mass % of the functional group-containing ethylene/α-olefin copolymer.

The limiting viscosity (η) of the ethylene/α-olefin copolymer, which is measured at 135° C. in a decalin (decahydronaphthalene) solution, is preferably in a range of 1.5 dl/g to 4.5 dl/g, and more preferably in a range of 1.6 dl/g to 3 dl/g. When the limiting viscosity (η) is within the above-described range, it is possible to highly satisfy both of the toughness and melt fluidity required of the resin member 105 of the embodiment.

The limiting viscosity (η) of the ethylene/α-olefin copolymer at 135° C. in decalin is measured as described below on the basis of an ordinary method.

First, 20 mg of a sample is dissolved in 15 ml of decalin, and the specific viscosity (ηsp) is measured at 135° C. using an ubbelohde viscometer. Next, the decalin solution is diluted by further adding 5 ml of decalin, and the specific viscosity is measured in the same manner. The ηsp/C value obtained when the concentration (C) is extrapolated to zero on the basis of the measurement result after the dilution operation and the viscosity measurement are repeated two more times is used as the limiting viscosity (η).

Particularly preferable examples of the functional group-containing compound include maleic acid anhydride. Maleic acid anhydride has a relatively strong reactivity with a polyolefin, has a structure that does not significantly change due to polymerization, and tends to be stable as a basic structure. Therefore, maleic acid anhydride has a variety of advantages such as the possibility of obtaining a stable functional group-containing polyolefin.

The amount of the functional group-containing compound introduced can be determined using well-known means such as the charge ratio when the polyolefin and the functional group-containing compound are reacted in the presence of the radical initiator or the like, a $^{13}$C NMR measurement, or a $^1$H NMR measurement. A variety of conditions as described below can be exemplified as specific NMR measurement conditions.

In the case of the $^1$H NMR measurement, the $^1$H NMR can be measured under conditions in which, for example, an ECX400-type nuclear magnetic resonance apparatus manufactured by JEOL Ltd. is used, deuterated ortho-dichlorobenzene is used as a solvent, the specimen concentration is 20 mg/0.6 mL, the measurement temperature is 120° C., the observation nucleus is $^1$H (400 MHz), the sequence is a single pulse, the pulse width is 5.12 microseconds (45° pulse), the repetition time is 7.0 seconds, and the integration number is set to 500 or more times. Hydrogen in tetramethylsilane is set to 0 ppm for the chemical shift of the criterion, but it is also possible to obtain the same results when the residual hydrogen-derived peak of deuterated ortho-dichlorobenzene is set to 7.10 ppm, and is used as the criterion value of the chemical shift. The peak of $^1$H or the like derived from the functional group-containing compound is assigned using an ordinary method.

In the case of the $^{13}$C NMR measurement, the $^{13}$C NMR can be measured under conditions in which, for example, an ECP500-type nuclear magnetic resonance apparatus manufactured by JEOL Ltd. is used, an ortho-dichlorobenzene/heavy benzene (80/20 vol %) mixed solvent is used as a solvent, the measurement temperature is 120° C., the observation nucleus is $^{13}$C (125 MHz), a single pulse proton decoupling 45° pulse is used, the repetition time is 5.5 seconds, the integration number is set to 10000 or more times, and 27.50 ppm is set as the criterion value of the chemical shift. A variety of signals are assigned on the basis of an ordinary method, and the amount can be determined on the basis of the integrated value of the signal intensities.

As a simpler method for measuring the amount of the functional group-containing compound introduced, there is a method in which the amount of the functional group introduced into a polymer having a different amount of the functional group-containing compound introduced thereinto is determined in advance by the above-described NMR measurement, the infrared (IR) spectrum of the polymer is measured, the standard curve is prepared on the basis of the intensity ratio of a specific peak, and the amount of the functional group introduced is determined on the basis of the above-described result. This method is simpler than the above-described NMR measurement; however, basically, it is necessary to prepare corresponding standard curves depending on the base resin or the type of the functional group. For the above-described reasons, the above-described method is preferably used for, for example, process management or the like in the resin production in a commercial plant.

Another preferable example of the polyolefin that serves as the base resin of the functional group-containing polyolefin is a propylene-based polymer. Hereinafter, a functional group-containing propylene-based polymer in which a propylene-based polymer is used as the base resin will be described.

For the functional group-containing propylene-based polymer as well, the preferable manufacturing method is the graft polymerization method. The basic preparation method is the same as that for the functional group-containing ethylene/α-olefin copolymer except for the fact that the propylene-based polymer is used instead of the ethylene/α-olefin copolymer.

In a case in which a pure propylene polymer is used as the propylene-based polymer, the MFR of the pure propylene polymer, which is calculated on the basis of ASTM D1238 and measured under conditions of a temperature of 230° C. and a load of 2.16 kg, is preferably in a range of 0.1 g/10 minutes to 800 g/10 minutes, more preferably in a range of 0.5 g/10 minutes to 100 g/10 minutes, and still more preferably in a range of 1.0 g/10 minutes to 20 g/10 minutes.

In a case in which a propylene/α-olefin random copolymer is used as the propylene-based polymer, specific examples of the α-olefin having 2 to 20 carbon atoms that is copolymerized with propylene include ethylene, 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-nonadecene, 1-eicosene, 4-methyl-1-pentene, and the like. The above-described α-olefins may be singly used, or two or more α-olefins may be used in a combined form.

In a case in which a propylene/α-olefin random copolymer is used, the MFR of the propylene/α-olefin random copolymer, which is calculated on the basis of ASTM D1238 and measured under conditions of a temperature of 230° C. and a load of 2.16 kg, is preferably in a range of 0.1 g/10 minutes to 100 g/10 minutes, more preferably in a range of 1.0 g/10 minutes to 50 g/10 minutes, and still more preferably in a range of 1.0 g/10 minutes to 20 g/10 minutes.

Specific examples of the propylene/α-olefin random copolymer include propylene/ethylene copolymers, propylene/1-butene copolymers, propylene/ethylene/1-butene copolymers, propylene/ethylene/1-octene copolymers, and the like. The above-described copolymers may be singly used, or two or more copolymers may be used in combination.

The above-described pure propylene polymer and propylene/α-olefin random copolymer can be manufactured using a well-known method of the related art in which a vanadium-based catalyst, a titanium-based catalyst, or a metallocene-based catalyst is used.

Examples of the functional group-containing compound that can be used for the preparation of the functional group-containing propylene-based polymer in the embodiment are the same as the functional group-containing compound that is used for the above-described functional group-containing ethylene/α-olefin copolymer.

In the functional group-containing propylene-based polymer in the embodiment, the propylene-based polymer (the pure propylene polymer, the propylene/α-olefin random copolymer, or the like) is graft-modified using an unsaturated carboxylic acid in an amount preferably in a range of $10^{-8}$ gram equivalent to $10^{-2}$ gram equivalent, and more preferably in a range of $10^{-7}$ gram equivalent to $10^{-3}$ gram equivalent per 1 gram equivalent of the propylene-based polymer that is the base resin. That is, regarding the functional group-containing propylene-based polymer, the propylene-based polymer that is used during the graft modification may be partially modified. In addition, the functional group-containing propylene-based polymer may be prepared using a so-called master batch.

The amount of the functional group-containing compound introduced in the functional group-containing propylene-based polymer is in a range of 0.001 mass % to 5 mass %, and preferably in a range of 0.01 mass % to 4 mass % with respect to 100 mass % of the functional group-containing propylene-based polymer.

When the functional group-containing propylene-based polymer is used, there are advantages in that the attaching force of the complex 106 described below is easily maintained even at a high temperature in a range of, for example, 80° C. to 125° C. Therefore, the complex can be preferably used in an aspect in which the complex is used in a relatively high temperature environment such as a vehicle component.

Examples of the commercially available aspect include "UNISTOLE (registered trademark) manufactured by Mitsui Chemicals, Inc." as a substance obtained by dissolving a maleic acid anhydride-graft modified propylene-based polymer in an aromatic compound solvent such as toluene.

In a case in which the complex 106 of the resin member 105 and the metal member 103 in the embodiment is obtained, there is no particular limitation regarding the method for using the primer resin material; however, generally, the primer resin material is applied to the metal member 103, thereby forming the primer layer 104 on the metal member 103. The formed primer layer 104 is used for injection joining described below.

There is no particular limitation regarding the method for applying the primer resin material to the metal member 103, and spray application is a preferable example. Specifically, the application can be carried out by spraying the primer resin material onto a surface to be coated using a spray gun. Additionally, coating using a bar coater, a spin coater, or the like is also a preferable example.

There is no particular limitation regarding the method for drying the primer resin material after the application, and the primer resin material can be dried using a well-known method, for example, natural drying or forcible drying by heating. In the embodiment, when the shape of the preferably-used metal member 103 is taken into account, it is preferable to include the above-described drying step and the heating step from the viewpoint of the intrusion of the primer resin material into the protrusions and recesses on the metal member 103.

Figure 3:
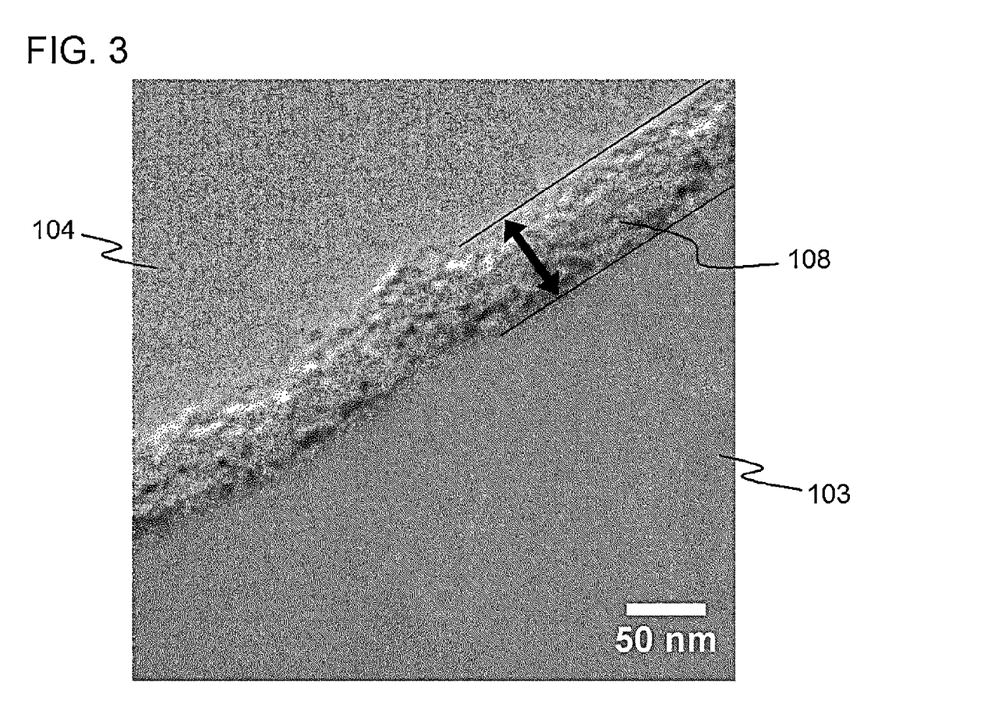
FIG. 3 is a view illustrating an image of a resin intrusion layer formed by infiltration of a primer resin material into fine protrusions and recesses on the metal member.

There is no particular limitation regarding the complex 106 of the embodiment, and for example, when the above-described method or the like is applied, it is possible to efficiently form the resin intrusion layer 108 that is formed by the infiltration of the primary resin material in the protrusions and recesses on the surface of the metal member 103. The thickness of the resin intrusion layer 108 is preferably in a range of more than or equal to 5 nm and less than or equal to 100 nm. The lower limit value of the thickness is preferably 10 nm, and more preferably 15 nm. On the other hand, the upper limit value is preferably 90 nm, and more preferably 70 nm.

When the thickness of the resin intrusion layer 108 is within the above-described range, an anchor effect is easily created, and it is possible to improve the attaching force between the primer layer 104 and the metal member 103.

The primer layer 104 made of the primer resin material, for example, infiltrates into the fine protrusions and recesses formed on the surface of the metal member 103, and forms the resin intrusion layer 108 in which the metal member 103 and the primer layer 104 are present in a combined form. FIG. 3 is a view illustrating an image of the resin intrusion layer 108 formed by the infiltration of the primer resin material into the fine protrusions and recesses on the metal member 103.

The shape of the interface between the fine protrusions and recesses formed on the surface of the metal member 103 and the primer layer 104 can be observed using, for example, a transmission electron microscope (TEM). Furthermore, an energy filter TEM (EF TEM) is a method capable of obtaining information regarding an electron beam that is not obtainable using an ordinary TEM, and when the electron beam is combined with the electron energy loss spectroscope (EELS), a highly accurate analysis at the nano-level becomes possible.

An electrospray ionization method (ESI) is a useful method for visualizing the above-described detailed information. This method is a method in which a specific element-derived energy-lost electron is extracted and an image is formed, and is capable of producing an atom mapping image. When the information regarding the energy-lost electron derived from metal and carbon is extracted using the above-described method, and an image is formed to obtain the information regarding the interface between the metal member 103 and the primer layer 104, it is possible to understand the shape of a portion in which the protrusion and recessed portion on the surface of the metal member 103 and the primer resin material are present in a combined form.

(Resin Member)

The resin member 105 configuring the complex 106 of the embodiment is made of, as a resin component, a resin material including a polyolefin as a main component.

The polyolefin preferably has high fluidity in order to favorably carry out injection molding. Therefore, the MFR of the polyolefin in the embodiment, which is calculated on the basis of ASTM D1238 and is measured under a condition of a load of 2.16 kg, is preferably in a range of 10 g/10 minutes to 200 g/10 minutes. The MFR can be measured at temperatures determined for individual resins, for example, 230° C. for the propylene-based polymer and 190° C. for the ethylene-based polymer.

As the polyolefin, any material belonging to so-called polyolefins such as the ethylene-based polymer and the propylene-based polymer may be used. In addition, among the above-described materials, the polyolefin may be a random copolymer, block copolymer, or graft copolymer of polyolefins.

In addition, the polyolefin may be a linear polyolefin or a polyolefin having a branched structure.

(Addition of a Filler to the Resin Member)

The resin member 105 in the embodiment preferably includes a filler to adjust the difference in the linear expansion rate between the metal member 103 and the resin member 105 and to improve the mechanical strength of the resin member 105.

Examples of the filler in the embodiment include fillers such as a fiber-form filler, a granular filler, and a plate-shaped filler. Examples of the fiber-form filler include a glass fiber, a carbon fiber, an aramid fiber, and the like. A specific example of the glass fiber is a chopped strand having an average fiber diameter in a range of 6 μm to 14 μm, or the like.

In addition, examples of the plate-shaped or granular filler include calcium carbonate, mica, a glass flake, a glass balloon, glass powder, magnesium carbonate, silica, talc, clay, a crushed carbon fiber, a crushed aramid fiber, and the like.

A filler that has been treated using a silane coupling agent or a titanate-based coupling agent is preferably used as the filler.

Among the above-described fillers, the resin member preferably includes at least one filler selected from a group consisting of a glass fiber, a carbon fiber, an aramid fiber, calcium carbonate, magnesium carbonate, silica, talc, clay, and glass powder.

In a case in which the resin member includes the filler, the content thereof is preferably in a range of more than or equal to 1 part by mass and less than or equal to 100 parts by mass, more preferably in a range of more than or equal to 5 parts by mass and less than or equal to 90 parts by mass, and particularly preferably in a range of more than or equal to 10 parts by mass and less than or equal to 80 parts by mass with respect to 100 parts by mass of the polyolefin.

In addition to cause an increase in the stiffness of the resin member 105, the filler has an effect that reduces and controls the linear expansion rate of the resin member 105. Particularly, in the case of the complex 106 of the metal member 103 and the resin member 105 of the embodiment, there are many cases in which the temperature dependencies of the shape stability of the metal member 103 and the resin member 105 are significantly different, and therefore, when the temperature is significantly changed, the complex 106 is likely to be strained. When the resin member includes the filler, it is possible to reduce the strain.

In addition, when the content of the filler is equal to or less than the upper limit value, it is possible to suppress the reduction of the toughness.

(Production of the Foam of the Resin Member)

In addition, there is a case in which the resin member 105 in the embodiment is turned into a form within the scope of the effect of the invention in order to reduce the weight of the complex 106 and to suppress warpage, sink mark, and the like after molding. The foam can be obtained by adding a foaming agent to the resin member 105 so as to generate foam. Examples of the foaming agent include a thermal decomposition-type foaming agent, a physical foaming agent, and the like.

The thermal decomposition-type foaming agent is a foaming agent that generates gas by being heated to the decomposition temperature or higher, thereby foaming the resin. Specific examples thereof include azo compounds represented by azodicarbonamide or barium azodicarboxylate, nitroso compounds represented by N,N'-dinitrosopentamethylenetetramine, hydrazine compounds represented by 4,4'-oxybis(benzenesulfonyl hydrazide) or hydrodicarbonamide, tetrazol compounds, inorganic foaming agents such as sodium hydrogen carbonate, and the like. The above-described thermal decomposition-type foaming agent may be singly used, or two or more thermal decomposition-type foaming agent may be used in combination.

There is no particular limitation regarding the method for mixing the thermal decomposition-type foaming agent with the resin member 105, and examples thereof include a method in which the thermal decomposition-type foaming agent is supplied to a molding machine such as an extruder or an injection molding machine together with the resin member 105.

The physical foaming agent is a foaming agent that does not cause a chemical reaction, and foams the resin using gas expanded by the temperature change or pressure change. Examples of the physical foaming agent include inorganic compounds such as nitrogen, carbon dioxide, and water; a variety of hydrocarbons such as methane, ethane, propane, butane, and pentane; ether such as CFC compounds, dimethyl ether, and methyl ethyl ether; and organic solvents represented by a variety of alcohols such as ethanol and methanol.

There is no particular limitation regarding the method for mixing the physical foaming agent with the resin member 105, and examples thereof include a method in which the resin member 105 is supplied to a molding machine, and the physical foaming agent is injected in the middle of the molding machine.

(Method for Manufacturing the Complex)

FIG. 1 is a configuration view schematically illustrating a process for manufacturing the complex 106 of the resin member 105 and the metal member 103. The method for manufacturing the complex 106 of the embodiment is preferably a method for manufacturing the complex using an injection molding method in which the metal member 103 is inserted. Specifically, the method includes the following steps.

(1) A step of installing the metal member 103 having the primer layer 104 formed on at least a part of the surface in a mold 102 for injection molding, and (2) A step of molding the resin material by injection into the mold 102 so that at least a part of the resin member 105 comes into contact with the primer layer 104.

The complex can be manufactured by combining other injection molding techniques as long as the two steps are included. Examples of the other injection molding techniques include gas-assisted molding, water-assisted molding, heat & cool molding, injection compression molding, core back molding, counter pressure molding, in-mold molding, and the like.

Hereinafter, the method for manufacturing the complex 106 of the embodiment will be described.

First, the mold 102 for injection molding is prepared, the mold 102 is opened, and the metal member 103 having the primer layer 104 formed on at least a part of the surface is installed on one surface. After that, the mold 102 is closed, and the resin material is injected into the mold 102 so that at least a part of the resin material including the polyolefin comes into contact with the primer layer 104, and is solidified. After that, the mold 102 is opened, and released, whereby the complex 106 can be obtained.

In the embodiment, in the complex 106 obtained through the injection joining step, the coexistence layer in which the primer resin material configuring the primer layer 104 and the resin material configuring the resin member 105 coexist is formed between the primer layer 104 and the resin member 105, and the thickness of the coexistence layer is in a range of more than or equal to 5 nm and less than or equal to 50 nm. The lower limit value of the thickness is preferably 10 nm, and more preferably 15 nm. On the other hand, regarding the upper limit value, since it is not easy to make the thickness of the coexistence layer substantially equal to or more than 50 nm, the upper limit value is preferably 50 nm. When the above-described coexistence layer is formed, it is possible to mold a complicated shape, which is an advantage of injection molding, and to realize a high joining strength.

Here, the thickness of the coexistence layer in the embodiment can be measured using, for example, the following method. First, a specimen is cut out from the complex 106 of the metal member 103 and the resin member 105, and is observed using a scanning probe microscope and a heater unit at a middle temperature between the melting points of the primer and the injection-molded polyolefin. At this time, the coexistence layer can be observed using the difference in melting point in terms of the difference in contrast of the hardness. In addition, the thickness of the observed coexistence layer is measured from an image. The thickness is measured at three points, and the average value of the thicknesses can be used as the thickness.

Next, the injection conditions will be described. When the above-described fixing principle of the invention is theoretically taken into account, the basic idea of the molding condition is to bring the molten resin into contact with the inserted metal member 103 at a high temperature and a high pressure. In the embodiment, conditions that are different from those for ordinary injection molding compared to what has been described above are employed.

In the embodiment, the temperature of the resin material during the injection molding is preferably 70° C. to 140° C. higher than the melting point of the polyolefin being used. That is, when the temperature of the resin material during the injection molding is represented by $T_1$ [° C.], and the melting point of the polyolefin is represented by $T_2$ [° C.], the $T_1$ is preferably in a range of $T_2+70 \leq T_1 \leq T_2+140$. In addition, the temperature of the resin material during the injection molding is more preferably 80° C. to 130° C. higher, and particularly preferably 85° C. to 125° C. higher than the melting point of the polyolefin being used. The temperature of the polyolefin may be considered as a so-called molding temperature (cylinder temperature).

When the temperature is set to be high as described above, it is possible to form a highly amorphous skin layer described below, and to maintain the molecular mobility of the polyolefin in the skin layer in a high state. As a result, it is considered that the coexistence layer can be easily formed.

In addition, in the embodiment, the temperature of the mold 102 during the injection molding is preferably set to be 10° C. to 70° C. lower than the melting point of the polyolefin being used. That is, when the temperature of the mold 102 during the injection molding is represented by $T_3$ [° C.], the $T_3$ is preferably in a range of $T_2-70 \leq T_3 \leq T_2-10$. In addition, the temperature of the mold 102 during the injection molding is more preferably 15° C. to 65° C. lower, and particularly preferably 20° C. to 60° C. lower than the melting point of the polyolefin being used. Furthermore, it is also preferable to set the temperature of the mold 102 to be slightly higher than usual. Specifically, the temperature of the mold is preferably equal to or higher than 100° C., and more preferably equal to or higher than 120° C. It is considered that, when the above-described conditions are set, it is possible to maintain the molecular mobility of the polyolefin in the highly amorphous skin layer or the molecular mobility of the resin in the primer layer 104 in a high state, and therefore the coexistence layer can be effectively formed.

In addition, the pressure dwell time during the molding is preferably in a range of more than or equal to 5 seconds and less than or equal to 120 seconds. It is considered that, when the pressure dwell time is set to be long as described above, it is possible to increase the thicknesses of the coexistence layer using the resin material and the primer resin material. Here, the pressure dwell time refers to a period of time during which the pressure at the nozzle is maintained at the set pressure from the end of filling in the injection molding machine.

The resin member 105 configuring the complex 106 of the embodiment is made of the resin material including the polyolefin as a main component. The MFR of the polyolefin being used, which is calculated on the basis of ASTM D1238 and is measured under a condition of a load of 2.16 kg, is preferably in a range of 10 g/10 minutes to 200 g/10 minutes.

In the complex 106 of the embodiment, when the complex 106 is fractured by displacing the metal member 103 and the resin member 105 in the complex 106 respectively, the fracture form is, generally, a cohesive fracture of the resin member 105. For example, since the joining strength is strong at the interface between the primer layer 104 and the resin member 105 obtained under the injection joining conditions, there is a tendency that the fracture of the resin member 105 is more likely to occur than the fracture in the above-described interface.

(Coexistence Layer Formed by Mutual Intrusion of the Primer Resin Material and the Resin Material)

In the past, it was known that, in the injection molding method of the polyolefin, orientation occurred in the vicinity of the surface of the mold 102, and oriented crystallization occurred. This fact is also one of the causes of a problem with the adhesiveness, coatability, and the like of an injection compact of the polyolefin. In addition, it can be easily predicted that the occurrence of oriented crystallization may hinder the formation of the "coexistence layer" in the interface with the primer layer 104. It is considered that, when a reinforcing material such as a glass fiber is included, the above-described phenomenon occurs more significantly. The inventors of the present application consider that, for the above-described reason, it is difficult to increase the joining strength between the metal member 103 and the resin member 105 in the injection joining of the polyolefin.

On the contrary, the reasons for the development of excellent joining strength in a case, for example, as in the manufacturing method of the embodiment are not clear at the moment, but the inventors assume the reasons to be as described below.

In the injection molding method, an oriented crystallization layer (also called a shear orientation layer) is formed in the vicinity of the surface of the mold 102. However, microscopically, a portion that comes into direct contact with the mold 102 is rapidly cooled, and therefore it is assumed that a poorly formed crystalline layer (also called a skin layer) is present. In the skin layer, since the molecular mobility is relatively high under a condition of the glass transition temperature or higher, for example, in a case in which the skin layer comes into contact with the primer layer 104 or the like, it is considered that the coexistence layer is easily formed compared with the oriented crystallization layer.

When the manufacturing method of the embodiment is used, it is possible to make the molecular mobility of the macromolecular chain in the skin layer relatively high, and therefore it is possible to form the coexistence layer having a thickness in a specific range between the primer layer 104 and the resin member 105. Therefore, it is considered that excellent joining strength can be developed between the metal member 103 and the resin member 105.

Here, in the embodiment, the polyolefin that is the base resin for the functional group-containing polyolefin configuring the primer layer 104 and the polyolefin included in the resin member 105 are preferably the same kind, and any of the above-described polyolefins is preferably a propylene-based polymer. When the polyolefins are the same kind, it is possible to efficiently form the coexistence layer into which the macromolecular chains mutually intrude.

In addition the complex member of the invention also adopts the following aspect.

The complex 106 according to the embodiment has a shape in which, as a resin component, the resin member 105 made of the resin material including the polyolefin as a main component, the primer layer 104, and the metal member 103 are arranged in this order.

Figure 4:
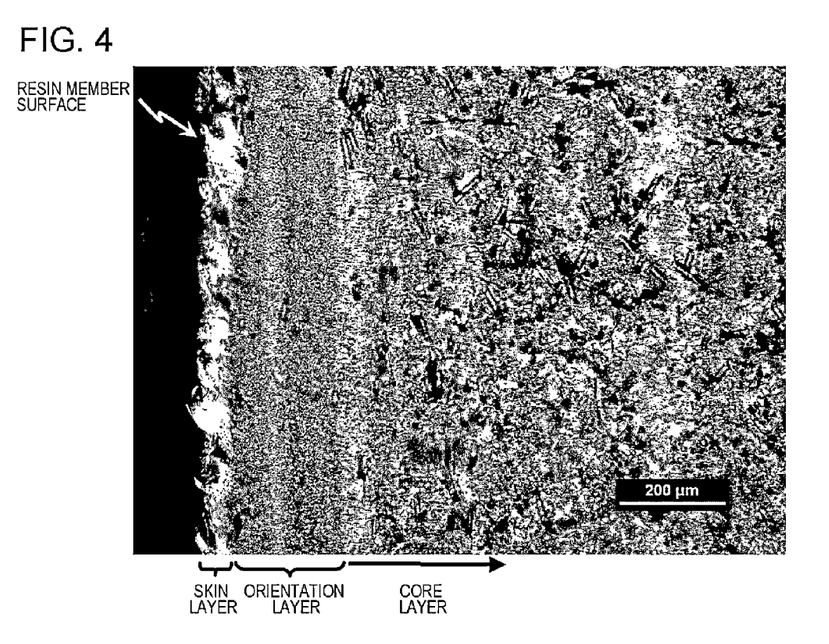
FIG. 4 is a view illustrating a polarization microscopy image of a skin layer, a shear orientation layer, and a core layer in the resin member.

In addition, the resin member 105 has the skin layer and the shear orientation layer that are sequentially formed with respect to the primer layer 104, the coexistence layer in which the primer resin material configuring the primer layer 104 and the resin layer coexist is formed between the primer layer 104 and the skin layer, and the thickness of the coexistence layer is in a range of more than or equal to 5 nm and less than or equal to 50 nm. In addition, the polyolefin included in the skin layer preferably includes more amorphous portions than the polyolefin included in the shear orientation layer.

Meanwhile, generally, a core layer is present on the shear orientation layer, and the core layer has a shape of being sandwiched by the shear orientation layer. Generally, in a case in which the shape of the resin member is cubic or the like, the core layer is located to be sandwiched by a first shear orientation layer and a second shear orientation layer. In this case, another skin layer that is different from the above-described skin layer may be present on the second shear orientation layer.

Here, the core layer refers to a portion other than the shear orientation layer and the skin layer.

Since the complex 106 of the invention has the shear orientation layer made of oriented crystals having excellent mechanical characteristics, the complex tends to have a higher stiffness compared with the complex 106 obtained by laminating the primer or the polyolefin onto the metal using a lamination method, a casting method, or the like.

The principal elements of individual means in the embodiment are equivalent to the above-described embodiment, and thus will not be described.

(Applications)

The complex 106 of the invention has a relatively high productivity and a high degree of freedom in the shape control, and thus can be applied to a variety of applications. Examples thereof include vehicle structural components, in-vehicle components, chassis of electronic devices, chassis of home appliances, structural components, mechanical components, a variety of vehicle components, electronic device components, household application such as furniture and kitchen components, medical devices, construction material components, other structural components, exterior components, and the like.

More specifically, the complex can be applied to the following components that are designed so that a portion in which only an insufficient strength is provided by a polyolefin resin is enhanced by metal. Examples thereof include, as vehicle-related components, an instrument panel, a console box, a door knob, a door trim, a shift lever, pedals, a glove box, a bumper, a hood, a fender, a trunk, a door, a roof, a seat, a radiator, an oil pan, a steering wheel, an ECU box, and electrical components, and the like. In addition, examples thereof include, as construction materials and furniture, a glass window frame, a handrail, a curtain rail, a wardrobe, a drawer, a closet, a bookshelf, a desk, a chair, and the like. In addition, examples thereof include, as precision electronic components, a connector, a relay, a gear, and the like. In addition, examples thereof includes, as transport containers, a transport container, a suitcase, a trunk, and the like.

In addition, the complex can be applied to a component used for a device in which the high thermal conductivity of the metal member 103 and the adiabatic properties of the polyolefin are combined together so that heat management is optimally designed. Examples thereof include home appliance products such as a refrigerator, a washing machine, a vacuum cleaner, a microwave, an air conditioner, a lighting device, an electric kettle, a television, a watch, a ventilation fan, a projector, and a speaker; electronic information devices such as a personal computer, a mobile phone, a smartphone, a digital camera, a tablet PC, a portable music players, a portable game player, a charger, and a battery; and the like.

Examples of other applications include toys, sports equipment, shoes, sandals, bags, dinnerware such as a fork, a knife, a spoon, and a dish, writing materials such as a ballpoint pen, a mechanical pencil, a file and a binder, cooking devices such as a frying pan, a kettle, a turner, a cookware vessel, and tongs, lithium ion secondary battery components, robots, and the like.

Thus far, the embodiment of the invention has been described, but the embodiment is simply an example of the invention, and it is also possible to employ a variety of configurations other than the above-described configuration.

EXAMPLES

Hereinafter, the embodiment will be described using examples and comparative examples, but the embodiment is not limited thereto. Meanwhile, FIGS. 1 to 3 will be used as common illustrations of the respective examples. FIG. 1 is a configuration view schematically illustrating a process for manufacturing the complex 106 of the resin member 105 and the metal member 103. Specifically, the drawing schematically illustrates a process in which the metal member 103 that has been worked into a predetermined shape and has the primer layer 104 formed thereon is installed in the mold 102 for injection molding, the resin material is injected from an injection molding machine 101 through a gate/runner 107, and the complex 106 integrated with the metal member 103 having fine protrusions and recesses formed thereon is manufactured.

Figure 2:
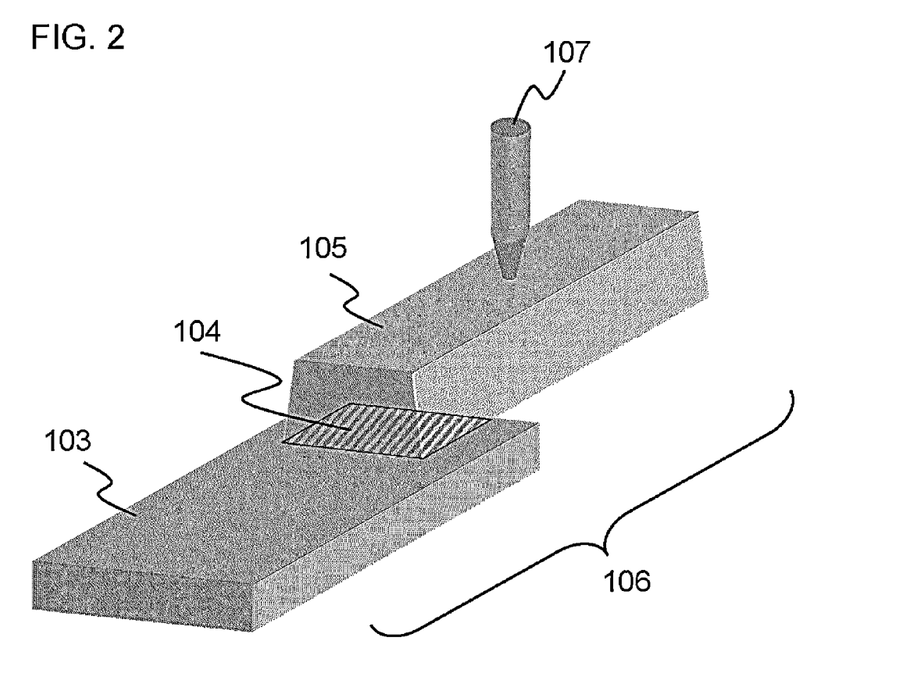
FIG. 2 is an external view schematically illustrating the complex of the resin member and the metal member.

FIG. 2 is an external view schematically illustrating the complex 106 of the resin member 105 and the metal member 103.

FIG. 3 is a view illustrating an image of the resin intrusion layer 108 formed by infiltration of the primer resin material into the fine protrusions and recesses on the metal member 103.

Hereinafter, a variety of joining strengths manufactured in relation to the invention will be described using the measured values of the shear breakage strengths, and the effectiveness of the invention will be confirmed.

Hereinafter, the method for evaluating and measuring the complexes obtained by the examples and the comparative examples will be described.

(Measurement of the Melt Flow Rate of the Polyolefin)

The melt flow rate was measured on the basis of the standards of ASTM 1238 under a condition of a load of 2.16 kg. The measurement temperature was selected from 190° C., 230° C., 260° C., and the like depending on the type of a resin being used. The measurement temperature was 190° C. for ethylene-based polymers, 230° C. for propylene-based polymers, and 260° C. for olefin polymers having a high melting point or a high glass transition temperature.

In the examples and comparative examples of the invention, propylene-based polymers were used, and therefore the melt flow rate was measured at 230° C.

(Melting Point (Tm) of the Polyolefin)

5 mg of a specimen was weighed, was placed in an aluminum pan, and was heated using a differential scanning calorimeter (DSC) (manufactured by Perkin Elmer Inc., Diamond DSC-type apparatus) in a nitrogen atmosphere at 230° C. for five minutes, thereby melting the specimen. After that, the specimen was cooled to room temperature at a temperature-decrease rate of 10° C./minute, was crystallized, was held at room temperature for 10 minutes, then, the endothermic curve of the specimen was obtained when the specimen was heated at a temperature-increase rate of 10° C./minute, and the peak temperature was used as the melting point.

(Measurement of the Resin Intrusion Layer)

A specimen was cut out from an integrated compact of the metal member 103 and the resin member 105 using a focused ion beam (FIB), and the elemental species was two-dimensionally mapped though the electron energy loss spectroscope (EELS) in which a ω-type energy filter was used using a TEM-type electron microscope JEM-2200FS (manufactured by JEOL Ltd.). The thickness of an area in which the elemental specimen (here, aluminum) of the metal and carbon that was a component of the polyolefin resin were present in a combined form was scanned from a two-dimensional image, thereby determining the thickness of the resin intrusion layer 108 formed by the infiltration of the primer resin material into the fine protrusions and recesses on the metal member 103.

As illustrated in FIG. 3, in the interface between a pure metal body and a region in which metal and carbon are present in a combined form, a range that was approximately three times as thick as the thickness of the resin intrusion layer 108 was approximated using a straight line. Furthermore, the interface between a region in which a carbon element was mapped and the region in which metal and carbon are present in a combined form was approximated using a straight line in parallel with the above-described straight line, and the distance between the two lines was measured. In Example 1, the thickness of the resin intrusion layer 108 was 56 nm.

(Thickness of the Coexistence Layer Formed Between the Primer Layer and the Resin Member)

A specimen was cut out from the complex 106 of the metal member 103 and the resin member 105, and was observed using a scanning probe microscope MMAFM-type multi-mode SPM unit (manufactured by Bruker Corporation) and a heater unit (SPM) at a middle temperature between the melting points of the primer and the injection-molded polyolefin. At this time, the coexistence layer was observed using the difference in melting point in terms of the difference in contrast of the hardness, and the thickness of the coexistence layer was measured. The thickness was measured at three points, and the average value thereof was used.

(Measurement of the Joining Strength of the Complex)

A tensile tester "model 1323 (manufactured by Aikoh Engineering Co. Ltd.)" was used, an exclusive jig was attached to the tensile tester, and the joining strength was measured at room temperature (23° C.) under conditions of an inter-chuck distance of 60 mm and a tensile rate of 10 mm/min.

(Observation of the Shear Orientation Layer)

A thin piece was produced from the injection-molded resin member 105 using a microtome HM330 (manufactured by MICROM), was installed in a mount, and then a polarization microscopy image was observed using a polarization microscope ECLIPSE LV100 (DS-Fil digital camera unit-equipped) (manufactured by Nikon Corporation). The specimen was rotated so that an oriented portion appeared black, and an image was photographed (refer to FIG. 4).

While a glass fiber or foam is shown in the sample, it is still possible to understand the degree of the orientation of the resin using black and white contrast. A skin layer that has been rapidly cooled due to the contact with the mold 102, and has a low degree of crystallization and weak orientation is shown on the outermost surface, and the shear orientation layer and the core layer having weak orientation are sequentially observed in the sample. In Example 1, the thicknesses of the respective layers were 50 μm for the skin layer and 200 μm for the shear orientation layer from the surface of the 3 mm-thick resin member 105.

Example 1

(Application of the Primer Resin Material)

The primer resin material was applied at room temperature using a Meyer bar to an aluminum piece having a surface treated according to the method of Experiment Example 1 in Pamphlet of International Publication No. WO2009/31632 so that the thickness of the primer layer 104 reached 10 μm. Next, the primer resin material was dried in an oven at 200° C. As the primer resin material, a maleic acid anhydride-modified propylene-based polymer (UNISTOLE R300 (registered trademark) manufactured by Mitsui Chemicals, Inc.) was used.

(Injection Molding)

A small-size dumbbell metal insert mold 102 was mounted in a JSW J85AD110H manufactured by the Japan Steel Works, Ltd., and the aluminum piece having the primer layer 104 formed thereon was installed in the mold 102. Next, a glass fiber-containing polyolefin was molded by injection in the mold 102 under conditions of a cylinder temperature of 250° C., a mold temperature of 120° C., an injection rate of 25 mm/sec, a pressure of 80 MPa, and a pressure dwell time of 10 seconds. As the glass fiber-containing polyolefin, a glass fiber-containing propylene-based polymer (manufactured by Prime Polymer Co. Ltd., PRM V7100, the content of the glass fiber: 20 mass %, the melting point of the polyolefin: 160° C., the MFR of the propylene-based polymer: 18 g/10 minutes) was used.

The above-described evaluations were carried out on the obtained complex 106. The evaluation results are described in Table 1.

Examples 2 and 3, and Comparative Examples 1 to 4

The complexes 106 were produced in the same manner as in Example 1 except that the material being used, the injection conditions, and the like were changed to the conditions described in Table 1, and the respective evaluations were carried out. Meanwhile, the materials described in Table 1 are as described below. The evaluation results are described respectively in Table 1.

Primer #1: maleic acid anhydride-modified propylene-based polymer (UNISTOLE R300 (registered trademark) manufactured by Mitsui Chemicals, Inc.)

Primer #2: maleic acid anhydride-modified propylene-based polymer (UNISTOLE R120K (registered trademark) manufactured by Mitsui Chemicals, Inc.)

Polyolefin #3: glass fiber-containing propylene-based polymer (manufactured by Prime Polymer Co. Ltd., PRM V7100, the content of the glass fiber: 20 mass %, the melting point of the polyolefin: 160° C., the MFR of the propylene-based polymer: 18 g/10 minutes)

Polyolefin #4: propylene-based homopolymer (manufactured by Prime Polymer Co. Ltd., PRM J105G, the melting point of the propylene-based copolymer: 160° C., the MFR of the propylene-based copolymer: 9 g/10 minutes)

Example 4

The complex 106 was produced by using a copper piece having a surface treated according to the method of Experiment Example 5 in Pamphlet of International Publication No. WO2009/31632 in the same manner as in Example 1, and the respective evaluations were carried out. The evaluation results are described respectively in Table 1.

Example 5

The complex 106 was produced by using an iron piece having a surface treated according to the method of Experiment Example 37 in Pamphlet of International Publication No. WO2009/31632 in the same manner as in Example 1, and the respective evaluations were carried out. The evaluation results are described respectively in Table 1.

Example 6

The complex 106 was produced by using a stainless steel piece having a surface treated according to the method of Experiment Example 11 in Pamphlet of International Publication No. WO2009/31632 in the same manner as in Example 1, and the respective evaluations were carried out. The evaluation results are described respectively in Table 1.

Example 7

The complex 106 was produced in the same manner as in Example 1 except that the material being used, the injection conditions, and the like were changed to the conditions described in Table 1, and the respective evaluations were carried out. The evaluation results are described respectively in Table 1.

Example 8

The complex 106 was produced by using a copper piece having a surface treated according to the method of Experiment Example 5 in Pamphlet of International Publication No. WO2009/31632 in the same manner as in Example 7, and the respective evaluations were carried out. The evaluation results are described respectively in Table 1.

Example 9

The complex 106 was produced by using an iron piece having a surface treated according to the method of Experiment Example 37 in Pamphlet of International Publication No. WO2009/31632 in the same manner as in Example 7, and the respective evaluations were carried out. The evaluation results are described respectively in Table 1.

Example 10

The complex 106 was produced by using a stainless steel piece having a surface treated according to the method of Experiment Example 11 in Pamphlet of International Publication No. WO2009/31632 in the same manner as in Example 7, and the respective evaluations were carried out. The evaluation results are described respectively in Table 1.

Example 11

The complex 106 was produced in the same manner as in Example 1 except that the material being used, the injection conditions, and the like were changed to the conditions described in Table 1, and the respective evaluations were carried out. The evaluation results are described respectively in Table 1.

TABLE 1

| | Metal surfaces treatment | Primer | Poly-ole-fin | Cylinder temperature (° C.) | Mold temperature (° C.) | Retained pressure (MPa) | Pressure dwell time (seconds) | Injection waiting time (seconds) | Resin intrusion layer (nm) | Coexistence layer (nm) | Joining strength (MPa) | Fracture form | Presence of shear orientation layer |
|---|---|---|---|---|---|---|---|---|---|---|---|---|---|
| Example 1 | Yes | #1 | #3 | 250 | 120 | 80 | 10 | 2 | 56 | 11 | 20 | Resin fracture | Yes |
| Example 2 | Yes | #1 | #3 | 250 | 120 | 80 | 60 | 2 | 56 | 17 | 25 | Resin fracture | Yes |
| Example 3 | Yes | #1 | #3 | 280 | 120 | 80 | 10 | 2 | 56 | 17 | 21 | Resin fracture | Yes |
| Example 4 | Yes | #1 | #3 | 250 | 120 | 80 | 10 | 2 | 56 | 11 | 21 | Resin fracture | Yes |
| Example 5 | Yes | #1 | #3 | 250 | 120 | 80 | 10 | 5 | 56 | 11 | 21 | Resin fracture | Yes |
| Example 6 | Yes | #1 | #3 | 250 | 120 | 80 | 10 | 15 | 56 | 11 | 20 | Resin fracture | Yes |
| Example 7 | Yes | #1 | #4 | 250 | 120 | 80 | 10 | 2 | 56 | 11 | 19 | Resin fracture | Yes |
| Example 8 | Yes | #1 | #4 | 250 | 120 | 80 | 10 | 2 | 56 | 11 | 20 | Resin fracture | Yes |
| Example 9 | Yes | #1 | #4 | 250 | 120 | 80 | 10 | 2 | 56 | 11 | 18 | Resin fracture | Yes |
| Example 10 | Yes | #1 | #4 | 250 | 120 | 80 | 10 | 2 | 56 | 11 | 20 | Resin fracture | Yes |
| Example 11 | Yes | #2 | #3 | 250 | 120 | 80 | 10 | 2 | 56 | 11 | 23 | Resin fracture | Yes |
| Comparative Example 1 | Yes | None | #3 | 250 | 120 | 80 | 10 | 2 | — | — | Not attached | — | Yes |
| Comparative Example 2 | No | #1 | #3 | 250 | 120 | 80 | 10 | 2 | — | — | Not attached | — | Yes |
| Comparative Example 3 | Yes | #1 | #3 | 250 | 50 | 80 | 10 | 2 | 56 | 4 | 5 | Interface fracture | Yes |
| Comparative Example 4 | Yes | #1 | #3 | 250 | 80 | 80 | 10 | 2 | 56 | 4 | 6 | Interface fracture | Yes |

As described in detail, in the complex 106 of the invention, the resin member 105 and the metal member 103 are integrated together without being easily separated. A high joining strength can be obtained by forming the coexistence layer into which macromolecular chains mutually intrude at the interface between the primer layer 104 and the injection-molded resin member 105.

The complex 106 of the invention is capable of forming a variety of shapes using a relatively simple method. Therefore, the complex significantly contributes to the industrial advancement of the invention.

Priority is claimed based on Japanese Patent Application No. 2012-116067, filed May 21, 2012, the content of which is incorporated herein by reference.

The invention claimed is:

1. A complex including a resin member made of a resin material including a polyolefin as a main component and a metal member which are joined through a primer layer,
   wherein the resin member is obtained by molding the resin material by injection so that at least a part of the resin member comes into contact with the primer layer,
   a coexistence layer in which a primer resin material configuring the primer layer and the resin material coexist is formed between the primer layer and the resin member,
   a thickness of the coexistence layer is in a range of more than or equal to 10 nm and less than or equal to 50 nm, and
   the primer layer consists of the layer including an acid-modified body of the polyolefin,
   wherein the complex includes a resin intrusion layer in which the metal member and the primer layer are present in a combined form.

2. The complex according to claim 1,
   wherein the resin member includes a shear orientation layer.

3. The complex according to claim 1,
   wherein a thickness of the resin intrusion layer is in a range of more than or equal to 5 nm and less than or equal to 100 nm.

4. The complex according to claim 1,
   wherein the metal member has fine protrusions and recesses formed in at least a portion in contact with the primer layer, and
   the resin intrusion layer is formed by infiltration of the primer resin material into the protrusions and recesses.

5. The complex according to claim 1,
   wherein the resin member is obtained by molding the resin material by injection into a mold in which the metal member has been installed under conditions satisfying the following requirements (1) to (4),
   (1) when a temperature of the resin material during injection molding is represented by $T_1$ [° C.], and a melting point of the polyolefin is represented by $T_2$ [° C.], the $T_1$ is in a range of $T_2+70 \leq T_1 \leq T_2+140$, (2) when a temperature of the mold during the injection molding is represented by $T_3$ [° C.], the $T_3$ is in a range of $T_2-70 \leq T_3 \leq T_2-10$, (3) a pressure dwell time during the injection molding is in a range of more than or equal to 5 seconds and less than or equal to 120 seconds, and (4) a melt flow rate, which is calculated on the basis of ASTM D1238 and is measured under a condition of a load of 2.16 kg, of the polyolefin is in a range of more than or equal to 10g/10 minutes and less than or equal to 200 g/10 minutes.

6. The complex according to claim 1,
wherein, when the complex is fractured by displacing the metal member and the resin member respectively, a fracture is a cohesive fracture of the resin member.

7. The complex according to claim 1,
wherein a polyolefin that is a base resin of the acid-modified body of the polyolefin and the polyolefin included in the resin member have at least one of the same repeating monomer unit.

8. The complex according to claim 7,
wherein both the polyolefin that is the base resin of the acid-modified body of the polyolefin and the polyolefin included in the resin member are propylene-based polymers.

9. The complex according to claim 1,
wherein the metal member includes at least one metal material selected from a group consisting of iron, stainless steel, aluminum, an aluminum alloy, magnesium, a magnesium alloy, copper, a copper alloy, titanium, and a titanium alloy.

10. The complex according to claim 9,
wherein the metal member includes at least one metal material selected from a group consisting of aluminum, an aluminum alloy, magnesium, a magnesium alloy, copper, and a copper alloy.

11. The complex according to claim 1,
wherein the resin member further includes at least one filler selected from a group consisting of a glass fiber, a carbon fiber, an aramid fiber, calcium carbonate, magnesium carbonate, silica, talc, clay, and glass powder, and when the content of the polyolefin is set to 100 parts by mass, the content of the filler is in a range of more than or equal to 1 part by mass and less than or equal to 100 parts by mass.

12. The complex according to claim 1,
wherein the resin member includes a skin layer and a shear orientation layer, and,
the skin layer and the primer layer are disposed through the coexistence layer.

13. A method for manufacturing the complex according to claim 1, comprising:
a step of installing the metal member having the primer layer formed on at least a part of a surface in a mold for injection molding; and
a step of molding the resin material by injection in the mold so that at least a part of the resin member comes into contact with the primer layer,
wherein, in the step of molding the resin material by injection in the mold, the resin material is molded by injection under conditions satisfying the following requirements (1) to (4), (1) when a temperature of the resin material during injection molding is represented by $T_1$ [° C.], and a melting point of the polyolefin is represented by $T_2$ [° C.], the $T_1$ is in a range of $T_2+70 \leq T_1 \leq T_2+140$, (2) when a temperature of the mold during the injection molding is represented by $T_3$ [° C.], the $T_3$ is in a range of $T_2-70 \leq T_3 \leq T_2-10$, (3) a pressure dwell time during the injection molding is in a range of more than or equal to 5 seconds and less than or equal to 120 seconds, and (4) a melt flow rate, which is calculated on the basis of ASTM D1238 and is measured under a condition of a load of 2.16 kg, of the polyolefin is in a range of more than or equal to 10 g/10minutes and less than or equal to 200 g/10 minutes.

* * * * *